(12) United States Patent
Farmer et al.

(10) Patent No.: US 11,473,007 B2
(45) Date of Patent: Oct. 18, 2022

(54) COMPOSITIONS AND METHODS FOR MICROBIAL ENHANCED DIGESTION OF POLYMERS IN FRACKING WELLS

(71) Applicant: Locus Oil IP Company, LLC, Solon, OH (US)

(72) Inventors: Sean Farmer, Ft. Lauderdale, FL (US); Ken Alibek, Solon, OH (US); Kent Adams, Oro Valley, AZ (US); Karthik N. Karathur, Solon, OH (US)

(73) Assignee: LOCUS OIL IP COMPANY, LLC, Solon, OH (US)

( * ) Notice: Subject to any disclaimer, the term of this patent is extended or adjusted under 35 U.S.C. 154(b) by 0 days.

(21) Appl. No.: 17/101,672

(22) Filed: Nov. 23, 2020

(65) Prior Publication Data
US 2021/0095185 A1 Apr. 1, 2021

Related U.S. Application Data

(63) Continuation of application No. 16/490,185, filed as application No. PCT/US2018/020706 on Mar. 2, 2018, now Pat. No. 10,844,276.
(Continued)

(51) Int. Cl.
| | |
|---|---|
| *E21B 37/00* | (2006.01) |
| *C09K 8/68* | (2006.01) |
| *C09K 8/60* | (2006.01) |
| *C09K 8/74* | (2006.01) |
| *C09K 8/80* | (2006.01) |
| *C09K 8/582* | (2006.01) |

(52) U.S. Cl.
CPC .............. *C09K 8/68* (2013.01); *C09K 8/582* (2013.01); *C09K 8/602* (2013.01); *C09K 8/74* (2013.01); *C09K 8/805* (2013.01); *E21B 37/00* (2013.01); *C09K 2208/24* (2013.01)

(58) Field of Classification Search
None
See application file for complete search history.

(56) References Cited

U.S. PATENT DOCUMENTS

| 3,871,956 A | 3/1975 | Azarowics |
| 4,450,908 A | 5/1984 | Hitzman |

(Continued)

FOREIGN PATENT DOCUMENTS

| CL | 46646 | 8/2010 |
| CL | 2012002063 A1 | 2/2013 |

(Continued)

OTHER PUBLICATIONS

Graeves et al., "*Starmerella bombicola*, an industrially relevant, yet fundamentally underexplored yeast"; FEMS Yeast Research, vol. 18, Jul. 5, 2018, p. 1-13. (Year: 2018).*

(Continued)

*Primary Examiner* — Andrew Sue-Ako
(74) *Attorney, Agent, or Firm* — Saliwanchik, Lloyd & Eisenschenk

(57) ABSTRACT

The present invention provides environmentally-friendly compositions and methods for degrading polymers used in fracking operations to enhance the recovery of oil and gas. Specifically, the compositions and methods utilized microorganisms and/or their growth by-products to degrade polymers, such as PGA, PLA and PAM, used in fracking wells.

3 Claims, 2 Drawing Sheets

Related U.S. Application Data

(60) Provisional application No. 62/528,718, filed on Jul. 5, 2017, provisional application No. 62/466,410, filed on Mar. 3, 2017.

(56) References Cited

U.S. PATENT DOCUMENTS

| | | | |
|---|---|---|---|
| 4,522,261 | A | 6/1985 | McInerney et al. |
| 4,905,761 | A | 3/1990 | Bryant |
| 5,165,477 | A | 11/1992 | Shell et al. |
| 5,869,325 | A | 2/1999 | Crabtree et al. |
| 9,422,470 | B2 | 8/2016 | Xu et al. |
| 9,550,937 | B2 | 1/2017 | Campbell et al. |
| 9,683,164 | B2 | 6/2017 | Gunawan et al. |
| 9,725,986 | B2 | 8/2017 | Xu et al. |
| 9,884,986 | B2 | 2/2018 | Gunawan et al. |
| 10,023,787 | B2 | 7/2018 | Benoit et al. |
| 10,190,038 | B2 | 1/2019 | Armstrong et al. |
| 10,844,276 | B2 * | 11/2020 | Farmer .................. C09K 8/62 |
| 2004/0231845 | A1 | 11/2004 | Cooke, Jr. |
| 2007/0092930 | A1 | 4/2007 | Lal et al. |
| 2007/0151726 | A1 | 7/2007 | Crews et al. |
| 2009/0029879 | A1 | 1/2009 | Soni et al. |
| 2010/0044031 | A1 | 2/2010 | Fallon et al. |
| 2012/0037368 | A1 | 2/2012 | Eick et al. |
| 2012/0122740 | A1 | 5/2012 | Roldan Carrillo et al. |
| 2012/0292022 | A1 | 11/2012 | Choban et al. |
| 2013/0062053 | A1 | 3/2013 | Kohr et al. |
| 2013/0264054 | A1 * | 10/2013 | East .................. E21B 29/08 166/270.1 |
| 2013/0319656 | A1 | 12/2013 | Brownlee |
| 2013/0324406 | A1 | 12/2013 | Chisholm et al. |
| 2014/0305649 | A1 | 10/2014 | Tang et al. |
| 2014/0315765 | A1 | 10/2014 | McDaniel |
| 2015/0037302 | A1 | 2/2015 | Bralkowski et al. |
| 2015/0051119 | A1 | 2/2015 | Masaki et al. |
| 2015/0118203 | A1 | 4/2015 | Boyette et al. |
| 2015/0300139 | A1 | 10/2015 | Armstrong et al. |
| 2016/0222280 | A1 | 8/2016 | Kohr et al. |
| 2016/0244347 | A1 | 8/2016 | Angel |
| 2016/0251565 | A1 | 9/2016 | Yanagisawa et al. |
| 2017/0051197 | A1 * | 2/2017 | Duran .................. C09K 8/62 |

FOREIGN PATENT DOCUMENTS

| | | |
|---|---|---|
| CN | 102352227 A | 2/2012 |
| CN | 105154050 A | 12/2015 |
| EP | 0540074 A1 | 5/1993 |
| GB | 2450204 A | 12/2008 |
| WO | 2010111226 A2 | 9/2010 |
| WO | 2017040903 A1 | 3/2017 |
| WO | 2017044953 A1 | 3/2017 |
| WO | 2018049182 A2 | 3/2018 |

OTHER PUBLICATIONS

De Almeida, D., et al., "Biosurfactants: Promising Molecules for Petroleum Biotechnology Advances." Frontiers in Microbiology, Oct. 2016, 7(1718): 1-14.

De Brito, D., Biosurfactants from renewable raw materials, Universidade do Minho Departamento de Engenharia Biologica, Nov. 2013, pp. 1-93.

De Oliveira, M., et al., "Review: Sophorolipids A Promising Biosurfactant and it's Applications." International Journal of Advanced Biotechnology and Research, 2015, 6(2): 161-174.

Elshafie, A. E., et al., "Sophorolipids Production by Candida bombicola ATCC 22214 and its Potential Application in Microbial Enhanced Oil Recovery." Frontiers in Microbiology, Nov. 2015, 6(1324): 1-11.

E Silva, F.C.P.R., et al., "Yeasts and bacterial biosurfactants as demulsifiers for petroleum derivative in seawater emulsions." AMB Expr., 2007, 7(202): 1-13.

Ghojavand, H. et al., "Isolation of thermotolerant, halotolerant, facultative biosurfactant-producing bacteria" Appl. Microbiol. Biotechnol, Oct. 2008, 80(6): 1073-1085, doi: 10,1007/s00253-008-1570-7.

Gudina, E., et al., "Biosurfactant-producing and oil-degrading Bacillus subtilis strains enhance oil recovery in laboratory sand-pack columns." Journal of Hazardous Materials, 2013, 261: 106-113.

Nitschke, M., et al., "Production and properties of a surfactant obtained from Bacillus subtilis grown on cassava wastewater." Bioresource Technology, 2006, 97: 336-341.

Santos, D.K.F., et al., "Biosurfactants: Multifunctional Biomolecules of the 21st Century." International Journal of Molecular Sciences, 2016,17(401): 1-31.

Sen, R., "Biosurfactants: Advances in Experimental Medicine and Biology" Landes Bioscience and Springer Science+Business Media, LLC, 2010, 672: 1-331.

Sharma, A. et al., "A study on biosurfactant production in *Lactobacillus* and *Bacillus* sp." Int. J. Curr. Microbiol. App. Sci., 2014, 3(11): 723-733.

Silva, R., et al., "Applications of Biosurfactants in the Petroleum Industry and the Remediation of Oil Spills." International Journal of Molecular Sciences, 2014, 15: 12523-12542.

* cited by examiner

COMPOSITIONS AND METHODS FOR MICROBIAL ENHANCED DIGESTION OF POLYMERS IN FRACKING WELLS

CROSS-REFERENCE TO A RELATED APPLICATION

This application is a continuation of co-pending U.S. patent application Ser. No. 16/490,185, filed Aug. 30, 2019; which is a National Stage Application of International Application No. PCT/US2018/020706, filed Mar. 2, 2018; which claims the benefit of the following U.S. provisional applications: Ser. No. 62/466,410, filed Mar. 3, 2017; and Ser. No. 62/528,718, filed Jul. 5, 2017; each of which is incorporated herein by reference in its entirety.

BACKGROUND OF THE INVENTION

Hydraulic fracturing, or "fracking," of earth formations around a wellbore is a process used to increase a well's productivity. Standard vertical wells undergo fracturing during original production or to stimulate production. Other applications involve the use of horizontal wells, wherein a vertical well is drilled to a desired depth, at which point the drill is turned to begin drilling horizontally. The horizontal portion of these wells can extend several thousands of feet in length.

Once drilling has occurred, thousands of gallons of "pad" fluid, an oil-based or water-based fluid, are injected into a formation at extreme pressures. This causes cracks or fractures to develop in the face of the rock at the wellbore. Continued fluid injection into the well then causes the fractures to increase in length and width. After a sufficient width is achieved, particles called "proppant" are added to the fluid, often coated with polymer materials to aid in proper functioning in tight subterranean formations. Silica sand is commonly used as a proppant in fracking applications.

After fluid injection has ceased, fracturing fluid flows out of the fractures, allowing the walls of the fractures to close on the proppant. The proppant particles then "prop" the walls of the fractures apart. Because proppant particles are normally much larger than the particles of the formation, the fluid permeability of a propped fracture is much greater than that of the natural formation; hence, the flow capacity of the well is increased. At the end of a fracturing treatment, proppant-laden fluid is "flushed" from the wellbore into the formation by a proppant-free displacement fluid.

Despite the increases in oil and gas productivity associated with the use of fracking, certain drawbacks and complications can arise, particularly with regard to the use of proppants. For example, depending on the proppant used, the proppant can affect flow rate of the fracturing fluid, and/or the proppant can be deposited improperly, or not deposited at all, into fractures. As a result, a variety of solutions for overcoming these complications have been developed, such as proppant coatings and chemical fracturing fluid additives.

Theoretical models generally indicate that the width of a fracture at the wellbore increases with effective viscosity of the injected fluid in the fracture, rate of fluid injection and volume of fluid injected. The fracturing fluid must be able to support the high pressures necessary for creating fractures with a width that can accept proppant. Ideally, this is done without using large quantities of fluid; however, the viscosity of a fracturing fluid is normally limited by pressure loss as the fluid is pumped down a wellbore. Fracturing fluids that are currently used minimize this pressure loss by employing polymer solutions that are highly non-Newtonian (shear-thinning). Otherwise, pressure loss due to friction in the tubing would only allow injection at very small rates. Water-soluble polymers can be cross-linked to increase viscosity, and this cross-linking is sometimes delayed to decrease pressure loss in tubulars.

Friction reducers can also be added to fracking fluids to lower friction pressure during pumping. Friction reducers are typically long chain, high molecular weight water soluble polymers. They operate by increasing laminar flow and decreasing turbulent flow in water as it is pumped down the wellbore, thus decreasing the energy required to move water and proppant particles down the well.

Furthermore, breakers can be used to lower the fracturing fluid's viscosity before the fluid flows back up the well. After the proppant is mixed or coated with the viscous fracturing fluid and pumped downhole to form a fracture, the fracturing fluid must be removed from the proppant pack. Unbroken fracturing fluid left in the fracture can reduce proppant pack permeability, resulting in less fluid flowback and less oil and gas production. Ideally, fracturing fluid is removed without moving the proppant from the fracture and without damaging the conductivity of the proppant bed. To accomplish this, the viscous fluid that carried the proppant can be thinned to a near-water state using breakers, such as enzymes or oxidizers.

Flowback of proppant from fractures and into the wellbore can also hinder the efficiency of oil and gas production. If proppant flows out of a fracture into the well, the fracture width decreases and hydrocarbon productivity declines. Polymeric fibers made of, for example, polylactide, or polylactic acid (PLA), have been used to prevent proppant flowback. The PLA fibers help suspend the proppant in the fracturing fluid and carry it down the well bore and into the formation. The fibers act to form a network that stabilizes the proppant pack, which is then deposited in the fractures, while preventing proppant settling at the bottom of the fracture. The polylactide fibers then dissolve, leaving "wormholes" through which gas and oil can flow into the well. PLA can also be used in the form of dissolvable balls and/or flakes as a friction reducer.

Another commonly used biodegradable polymer in fracking operations is polyglycolide, or polyglycolic acid (PGA), in the form of balls or fibers. Variable sized fracking balls are often used for the fracking of multiple frac zones. Use of balls allows untreated zones to be isolated from already treated zones so that hydraulic pressure fractures the new zones instead of merely disrupting the already-fracked zones. The process involves inserting a plurality of frac sleeves, which include a mechanically-actuated sliding sleeve engaged by a ball seat, into an untreated zone. The frac sleeves may have progressively smaller ball seats.

The smallest frac balls are inserted into the sleeves first, passing through all but the last and smallest frac sleeve, where they seat. Applied pressure from the surface causes the frac ball to press against the ball seat, which mechanically engages a sliding sleeve. The pressure causes the sleeve to mechanically shift, opening a plurality of frac ports and exposing the formation. High-pressure fracking fluid is injected from the surface, forcing the frac fluid into the formation, and the zone is fracked. After the zone is fracked, the second-smallest frac ball is pumped into the well bore, and seats in the furthest available sleeve. That zone is fracked, and the process is continued with increasingly larger frac balls, the largest ball being inserted last.

Additionally, many well operators use polyacrylamide (PAM) gel as a friction reducer in amounts around 1 to 2 parts per 1,000 gallons of water; however, once the gel is downwell it serves no other purpose, does not degrade readily, and is not easily recovered back to the surface. Ineffective attempts to cleave the gel using sodium chromite or sodium bromide have been made, but often leave significant amounts of remaining gel.

The utility of polymeric fracking substances is limited by their capacity to degrade under temperature and moisture conditions that exist in a well, as well as their ability to be recovered back up the well. Increasing the viscosity of fracturing fluids creates even further limitations, as the water-soluble polymers most commonly used to increase the viscosity do not completely degrade. Instead, they leave a residue that hinders the flow capacity of the proppant left in the fracture. Additionally, polymers used as friction reducers, breakers, crosslinkers, or other additives can lead to similar difficulties due to their slow rate of degradation.

The rate at which PLA or PGA degrades, for example, is important for successful application in subterranean settings, such as those described above. The degradation of PIA and PGA is thought to proceed mainly through hydrolysis, and the degradation rate is highly dependent on local conditions, e.g., temperature. These cross-linked polymers are subjected to very high temperatures in the formations, which decrease rapidly as fluid is pumped through well tubing.

Thus, there is a need for compositions and methods for quickly degrading and recovering PLA, PGA and other polymeric substances used as friction reducers, breakers, and/or other fracturing fluid additives and coatings.

BRIEF SUMMARY OF THE INVENTION

The subject invention provides microbes, as well as by-products of their growth, such as biosurfactants, solvents and/or enzymes. The subject invention also provides methods of using these microbes and their by-products in hydraulic fracking operations to enhance the dissolution of polymeric fracturing fluid additives and/or proppant coatings. Advantageously, the methods of the subject invention are environmentally-friendly, operational-friendly and cost-effective.

In preferred embodiments, the subject invention provides materials and methods for improving oil and gas production by treating an oil and gas containing formation undergoing hydraulic fracturing treatment with a microbe-based composition capable of dissolving polymers that have been applied as, for example, fracturing fluid additives and/or proppant coatings.

In one embodiment, the subject invention provides a microbe-based composition for enhancing oil and gas recovery from a hydrocarbon-bearing formation, the composition comprising a microorganism and/or its growth by-products. The growth by-products can be, for example, biosurfactants, solvents, enzymes and/or other metabolites.

In one embodiment, the microbe is one or more biosurfactant-, solvent- and/or enzyme-producing bacteria or yeasts, or a combination thereof. In one embodiment, the microbe-based composition comprises a "killer yeast," such as, for example, *Wickerhamomyces anomalus*, and/or products of the growth of this species. In one embodiment, the microbe is a *Starmerella* clade yeast. In one embodiment the microbe is a *Bacillus* clade bacteria.

In one embodiment, the microbe-based composition can further comprise enzymes that enhance degradation of polymers, such as, for example, proteases, lipases and/or esterases.

In one embodiment, the microbe-based composition can further comprise materials to enhance microbe growth during application. These materials can be, for example, nutrients and/or germination enhancers. The nutrient sources can include, for example, nitrogen, nitrates, nitrites, phosphorus, magnesium and/or carbon. The germination enhancers can include, for example, L-alanine, L-valine, L-asparagine and/or manganese in micromolar amounts.

In certain embodiments, the compositions of the subject invention have advantages over, for example, biosurfactants, solvents, and/or enzymes alone, including one or more of the following: high concentrations of mannoprotein as a part of a yeast cell wall's outer surface; the presence of beta-glucan in yeast cell walls; and the presence of biosurfactants and other metabolites (e.g., lactic acid, ethanol, ethyl acetate, etc.) in the culture. These metabolites can, for example, act as solvents.

In one embodiment, the subject invention provides yeast fermentation products that can be used to digest, or enhance the degradation of, polymers in fracking wells. The yeast fermentation product can be obtained via cultivation of a biosurfactant-, solvent- and/or enzyme-producing yeast, such as, for example, *Wickerhamomyces anomalus* (*Pichia anomala*). The fermentation broth after 7 days of cultivation at 25-30° C. can contain the yeast cell suspension and, for example, 4 g/L or more of biosurfactant.

The yeast fermentation product can also be obtained via cultivation of a biosurfactant-, solvent- and/or enzyme-producing yeast, such as, for example, *Starmerella bombicola*. The fermentation broth after 5 days of cultivation at 25° C. can contain the yeast cell suspension and, for example, 100 g/L or more of biosurfactant.

In one embodiment, the composition according to the subject invention is obtained through cultivation processes ranging from small to large scale. The cultivation process can be, for example, submerged cultivation, solid state fermentation (SSF), and/or a combination thereof.

As shown in FIGS. 1 and 2, the yeast fermentation products can be incubated with fracking fluid containing, for example, PLA balls, for 24 hours. A PLA ball after incubation with the yeast fermentation product was completely dissolved, whereas when incubated for the same time period with water alone, only 1% total dissolution occurred (requiring approximately one month to dissolve completely).

Advantageously, the subject microbe-based compositions can be used to digest, or enhance the degradation of, polymers in, for example, fracking wells. The subject composition can also be useful as a flowback solution, wherein the biosurfactants and other microbial growth by-products can efficiently decrease water surface tension to a desirable range of, for example, 28-30 dynes/cm. The compositions can also help reduce the energy input required for flushing out fracking materials post-use.

In one embodiment the subject invention provides a method for improving oil and gas production efficiency by applying a composition comprising a biosurfactant-, solvent- and/or enzyme-producing microorganism, and/or a growth by-product thereof, to an oil well. The growth by-product can be any microbial metabolite, such as, for example, a biosurfactant, a solvent and/or an enzyme.

In one embodiment the method can be used for enhancing oil and gas recovery by applying the microbe-based composition to an oil well undergoing hydraulic fracking treatment.

The method can further comprise adding materials to enhance microbe growth and/or germination during application (e.g., adding nutrients to promote microbial growth and/or germination enhancers). In one embodiment, the nutrient sources can include, for example, nitrogen, nitrate, phosphorus, magnesium and/or carbon. In one embodiment, the germination enhancers can include, for example, L-alanine, L-valine, L-asparagine and/or manganese in micromolar amounts.

In one embodiment, the method can further comprise adding polymer-degrading enzymes to the site in order to enhance polymer degradation.

Preferably, the microbes of the microbe-based composition and/or their growth byproducts can quickly digest polymers such as polylactic acid (PLA) and/or polyglycolic acid (PGA). The microbes can be inactive, live (or viable), or in spore form, at the time of application.

In one embodiment, the microorganism is a yeast, for example, *Wickerhamomyces anomalus* and/or *Starmerella bombicola*. In one embodiment, the microorganism is a bacteria, such as, for example, a species of *Bacillus* clade bacteria. In one embodiment, a combination of microorganisms is utilized in the microbe-based composition.

The microorganisms can grow in situ and produce active compounds onsite. Consequently, a high concentration of, for example, biosurfactant, solvent, and/or enzyme, and biosurfactant-producing microorganisms at a treatment site (e.g., an oil well) can be achieved easily and continuously.

In one embodiment, the subject invention provides methods of recovering polymeric substances that remain in fracking wells. For example, biosurfactants produced by methods and microorganisms of the present invention can reduce interfacial tension of fluids used for uplifting polymeric fracking substances, such as polyacrylamide (PAM) gel friction reducers. In another embodiment, the biosurfactants can be used to cleave PAM gel prior to uplifting.

The subject invention can be useful for well completion, particularly in fracking operations, as well as restoring the health of oil and gas-bearing formations. For example, the subject compositions and methods can aid in the repair of formation damage in the areas surrounding a wellbore, and can remediate polymers (e.g., PLA and PGA) and biopolymers (e.g., guar gum and xanthan gum) that are leftover from previous fracking operations. Thus, clogged channels can be opened up within formations to allow for further fracking opportunities.

In one embodiment, the subject invention provides methods of producing a biosurfactant, solvent, metabolite, and/or an enzyme by cultivating a microbe strain of the subject invention under conditions appropriate for growth and surfactant, solvent, metabolite, and/or enzyme production; and purifying the surfactant, solvent, metabolite, and/or enzyme for subsequent use according to the subject invention.

Advantageously, the present invention can be used without releasing large quantities of inorganic compounds into the environment. Additionally, the compositions and methods utilize components that are biodegradable and toxicologically safe. Thus, the present invention can be used in all possible operations of oil and gas production as a "green" treatment.

DETAILED DESCRIPTION OF THE INVENTION

Figure 1:
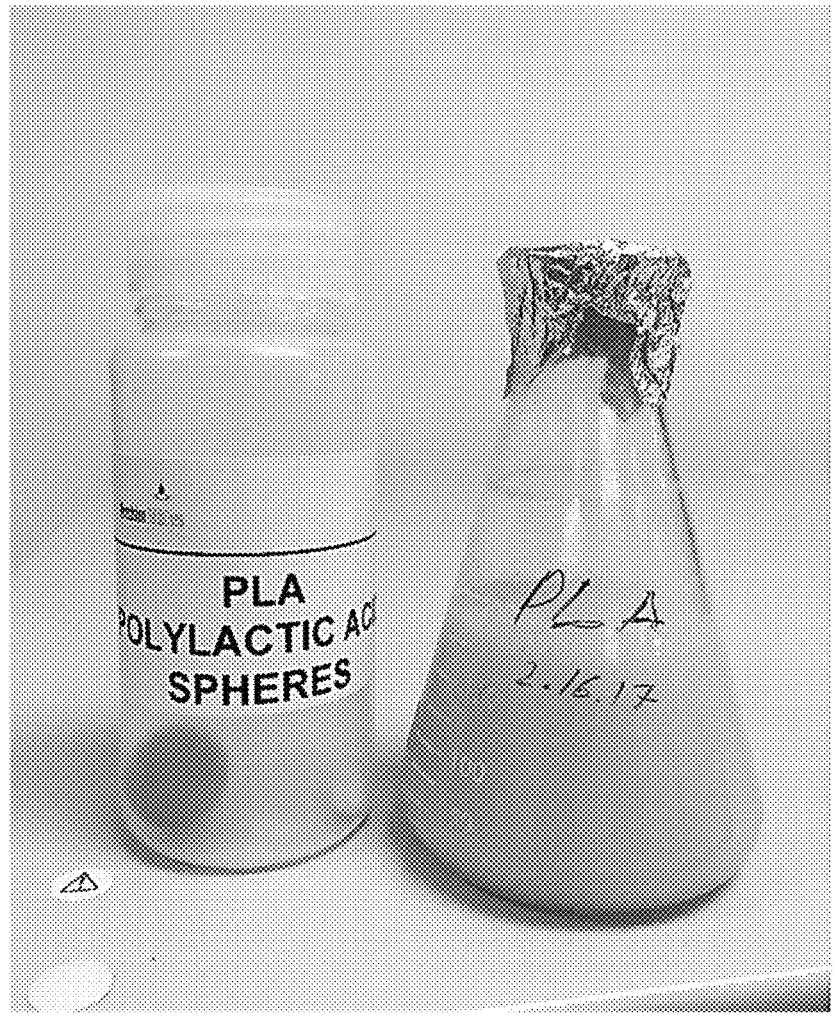
FIG. 1 shows a PLA ball (left) and a dissolved PLA ball after application of yeast treatment (right).

The subject invention provides microbes, as well as by-products of their growth, such as biosurfactants, solvents and/or enzymes. The subject invention also provides methods of using these microbes and their by-products in hydraulic fracking operations to enhance the dissolution of polymeric fracturing fluid additives and/or proppant coatings. Advantageously, the methods of the subject invention are environmentally-friendly, operational-friendly and cost-effective.

In preferred embodiments, the subject invention provides materials and methods for improving oil and gas production by treating an oil and gas containing formation undergoing hydraulic fracturing treatment with a microbe-based composition capable of dissolving polymers that have been applied as, for example, fracturing fluid additives and/or proppant coatings.

In one embodiment, the subject invention provides a microbe-based composition for enhancing oil and gas recovery from a hydrocarbon-bearing formation, the composition comprising a microorganism and/or its growth by-products. The growth by-products can be, for example, biosurfactants, solvents, enzymes and/or other metabolites.

In one embodiment the subject invention provides a method for improving oil and gas production efficiency by applying a composition comprising a biosurfactant-, solvent- and/or enzyme-producing microorganism, and/or a growth by-product thereof, to an oil well. The growth by-product can be any microbial metabolite, such as, for example, a biosurfactant, a solvent and/or an enzyme.

Selected Definitions

As used herein, reference to a "microbe-based composition" means a composition that comprises components that were produced as the result of the growth of microorganisms or other cell cultures. Thus, the microbe-based composition may comprise the microbes themselves and/or by-products of microbial growth. The microbes may be in a vegetative state, in spore form, in mycelial form, in any other form of propagule, or a mixture of these. The microbes may be planktonic or in a biofilm form, or a mixture of both. The by-products of growth may be, for example, metabolites, cell membrane components, expressed proteins, and/or other cellular components. The microbes may be intact or lysed. In preferred embodiments, the microbes are present, with broth in which they were grown, in the microbe-based composition. The cells may be present at, for example, a concentration of $1 \times 10^4$, $1 \times 10^5$, $1 \times 10^6$, $1 \times 10^7$, $1 \times 10^8$, $1 \times 10^9$, $1 \times 10^{10}$, or $1 \times 10^{11}$ or more propagules per milliliter of the composition. As used herein, a propagule is any portion of a microorganism from which a new and/or mature organism can develop, including but not limited to, cells, spores, conidia, mycelia, buds and seeds.

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers, such as plant hormones, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, an "isolated" or "purified" nucleic acid molecule, polynucleotide, polypeptide, protein or organic compound such as a small molecule (e.g., those described below), is substantially free of other compounds, such as cellular material, with which it is associated in nature. As used herein, reference to "isolated" in the context of a microbial strain means that the strain is removed from the environment in which it exists in nature. Thus, the isolated strain may exist as, for example, a biologically pure culture, or as spores (or other forms of the strain) in association with a carrier.

In certain embodiments, purified compounds are at least 60% by weight (dry weight) the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis. A purified or isolated polynucleotide (ribonucleic acid (RNA) or deoxyribonucleic acid (DNA)) is free of the genes or sequences that flank it in its naturally-occurring state. A purified or isolated polypeptide is free of the amino acids or sequences that flank it in its naturally-occurring state.

As used herein, "applying" a composition or product refers to contacting it with a target or site such that the composition or product can have an effect on that target or site. The effect can be due to, for example, microbial growth and/or the action of a biosurfactant or other growth by-product. For example, the microbe-based compositions or products can be injected into oil wells and/or the piping, pumps, tanks, etc. associated with oil wells.

As used herein, a "biofilm" is a complex aggregate of microorganisms, such as bacteria, wherein the cells adhere to each other. The cells in biofilms are physiologically distinct from planktonic cells of the same organism, which are single cells that can float or swim in liquid medium.

As used herein, "harvested" in the context of fermentation of microorganisms refers to removing some or all of the microbe-based composition from a growth vessel.

A "metabolite" refers to any substance produced by metabolism or a substance necessary for taking part in a particular metabolic process. A metabolite can be an organic compound that is a starting material (e.g., glucose), an intermediate (e.g., acetyl-CoA), or an end product (e.g., n-butanol) of metabolism. Examples of metabolites can include, but are not limited to, enzymes, toxins, acids, solvents, alcohols, proteins, carbohydrates, vitamins, minerals, microelements, amino acids, polymers, and biosurfactants.

As used herein, "modulate" is interchangeable with alter (e.g., increase or decrease). Such alterations are detected by standard art known methods such as those described herein.

As used herein, "surfactant" refers to a compound that lowers the surface tension (or interfacial tension) between two liquids or between a liquid and a solid. Surfactants act as detergents, wetting agents, emulsifiers, foaming agents, and/or dispersants. A surfactant produced by microorganisms is referred to as a "biosurfactant."

In some embodiments, the microbes used according to the subject invention are "surfactant over-producing." For example, the strain may produce at least 0.1-10 g/L, e.g., 0.5-1 g/L surfactant. For example, the strain may produce at least 10%, 25%, 50%, 100%, 2-fold, 5-fold, 7.5 fold, 10-fold, 12-fold, 15-fold or more surfactant compared to other oil-recovery microbial strains. In one embodiment, where *Bacillus subtilis* is used according to the subject invention, *Bacillus subtilis* ATCC 39307 is used herein as a reference strain.

Ranges provided herein are understood to be shorthand for all of the values within the range. For example, a range of 1 to 20 is understood to include any number, combination of numbers, or sub-range from the group consisting of 1, 2, 3, 4, 5, 6, 7, 8, 9, 10, 11, 12, 13, 14, 15, 16, 17, 18, 19 or 20 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduces" refers to a negative alteration of at least 1%, 5%, 10%, 25%, 50%, 75%, or 100%.

As used herein, "reference" refers to a standard or control condition.

As used herein, "oil and natural gas production" refers to any and all operations involved in the extraction of crude oil and/or natural gas from the earth, processing, and through its eventual purchase and use by consumers. Oil and natural gas production can include, but is not limited to, drilling, pumping, recovering, fracking, water-flooding, transmission, processing, refining, transportation, and storage of oil and/or gas.

As used herein, "enhancing oil and gas recovery" means increasing or improving the quality and/or quantity of oil and/or gas extracted and ultimately produced from an oil and gas containing site.

As used herein, "polymer" refers to any macromolecular compound prepared by bonding one or more similar molecular units, or monomers, together. Polymers include synthetic and natural polymers. Exemplary polymers include rubbers, starches, resins, guar gum, neoprene, nylon, PVC, silicone, cellulose, polystyrene, polyethylene, polypropylene, polyacrylonitrile, polyamines, polysaccharides, polynucleotides, polybutylene adipate terephthalate (PBAT), polyhydroxyalkanoates (PHAs), polybytlene succinate (PBS), polycaprolactone (PCL), polyglycolic acid (PGA), polyhydroxybutyrates (PHBs), polyesters such as polylactide (PLA), polyacrylamides (PAM), and others.

As used herein, "degradation" of a polymer can be used interchangeably with "dissolution," "digestion," and "remediation" and refers to the breakdown or depolymerization of the polymer into more water soluble, lower molecular weight molecules capable of flowing out of a wellbore fracture. Degradation can occur by any means, including but not limited to photo-induced degradation, thermal degradation, chemical degradation, such as ozonolysis, hydrolysis, or oxidation, and biodegradation.

As used herein, "polymer-degrading enzyme" refers to any enzyme capable of degrading or enhancing the degradation or dissolution of a polymer. Non-limiting examples of polymer-degrading enzymes include proteases (or proteinases, or proteinase enzymes), esterases, and lipases. Protease enzymes have been shown to hasten the hydrolysis or degradation of PLA. Esterases and lipases may also be suitable for other degradable polymers, such as poly(hydroxybutyrates) or aliphatic polyesters. Typically, these enzymes are isolated from plants, animals, bacteria, and fungi, and can also be obtained commercially.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Unless specifically stated or obvious from context, as used herein, the term "or" is understood to be inclusive. Unless specifically stated or obvious from context, as used herein, the terms "a", "an", and "the" are understood to be singular or plural.

Unless specifically stated or obvious from context, as used herein, the term "about" is understood as within a range of normal tolerance in the art, for example, within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

Any compositions or methods provided herein can be combined with one or more of any of the other compositions and methods provided herein.

Other features and advantages of the invention will be apparent from the following description of the preferred embodiments thereof, and from the claims. All references cited herein are hereby incorporated by reference.

Microbial Strains Grown in Accordance with the Subject Invention

The microorganisms grown according to the systems and methods of the subject invention can be, for example, bacteria, yeast and/or fungi. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In one embodiment, the microorganism is a yeast or fungus. Yeast and fungus species suitable for use according to the current invention, include *Candida, Saccharomyces* (*S. cerevisiae, S. boulardii sequela, S. torula*), *Issatchenkia, Kluyveromyces, Pichia, Wickerhamomyces* (e.g., *W. anomalus*), *Starmerella* (e.g., *S. bombicola*), *Mycorrhiza, Mortierella, Phycomyces, Blakeslea, Thraustochytrium, Phythium, Entomophthora, Aureobasidium pullulans, Pseudozyma aphidis, Fusarium venenalum, Aspergillus, Trichoderma* (e.g., *T. reesei, T. harzianum, T. hamatum, T. viride*), and/or *Rhizopus* spp.

In one embodiment, the yeast is a killer yeast. As used herein, "killer yeast" means a strain of yeast characterized by its secretion of toxic proteins or glycoproteins, to which the strain itself is immune. The exotoxins secreted by killer yeasts are capable of killing other strains of yeast, fungi, or bacteria. For example, microorganisms that can be controlled by killer yeast include *Fusarium* and other filamentous fungi. Examples of killer yeasts according to the present invention are those that can be used safely in the food and fermentation industries, e.g., beer, wine, and bread making; those that can be used to control other microorganisms that might contaminate such production processes; those that can be used in biocontrol for food preservation; those than can be used for treatment of fungal infections in both humans and plants; and those that can be used in recombinant DNA technology. Such yeasts can include, but are not limited to, *Wickerhamomyces, Pichia* (e.g., *P. anomala, P. guielliermondii, P. kudriavzevii, P. occidentalis*), *Hansenula, Saccharomyces, Hanseniaspora*, (e.g., *H. uvarum*), *Ustilago maydis, Debaryomyces hansenii, Candida, Cryptococcus, Kluyveromyces, Torulopsis, Ustilago, Williopsis, Zygosaccharomyces* (e.g., *Z. bailii*) and others.

In certain embodiments, the microbial strain is a *Pichia* yeast selected from *Pichia anomala* (*Wickerhamomyces anomalus*), *Pichia guilliermondii*, and *Pichia kudriavzevii*. *Wickerhamomyces anomalus*, in particular, is an effective producer of various solvents, enzymes, killer toxins, as well as sophorolipid biosurfactants.

In one embodiment, the microbial strain is chosen from the *Starmerella* clade. A culture of a *Starmerella* microbe useful according to the subject invention, *Starmerella bombicola*, can be obtained from the American Type Culture Collection (ATCC), 10801 University Blvd., Manassas, Va. 20110-2209 USA. The deposit has been assigned accession number ATCC No. 22214 by the depository.

In one embodiment, the subject invention provides the use of yeast strain ATCC 22214 and mutants thereof. This strain is an effective producer of sophorolipid biosurfactants.

In preferred embodiments, the microorganisms are bacteria, including Gram-positive and Gram-negative bacteria. The bacteria may be, for example *Bacillus* (e.g., *B. subtilis, B. licheniformis, B. firmus, B. laterosporus, B. megaterium, B. amyloliquifaciens*), *Clostridium* (*C. butyricum, C. tyrobutyricum, C. acetobutyricum, Clostridium* NIPER 7, and *C. beijerinckii*), *Azobacter* (*A. vinelandil, A. chroococcum*), *Pseudomonas* (*P. chlororaphis* subsp. *aureofaciens* (*Kluyver*), *P. aeruginosa*), *Agrobacterium radiobacter, Azospirillumbrasiliensis, Rhizobium, Sphingomonas paucimobilis, Ralslonia eulropha*, and/or *Rhodospirillum rubrum*.

In one embodiment, the microorganism is a strain of *B. subtilis*, such as, for example, *B. subtilis* var. *locuses* B1 or B2, which are effective producers of, for example, surfactin and other biosurfactants, as well as biopolymers. This specification incorporates by reference International Publication No. WO 2017/044953 A1 to the extent it is consistent with the teachings disclosed herein. In another embodiment, the microorganism is a strain of *Bacillus licheniformis*, which is an effective producer of biosurfactants as well as biopolymers, such as levan.

In certain embodiments, the present invention utilizes *Bacillus subtilis* strains with enhanced biosurfactant production compared to wild type *Bacillus subtilis* as well as compared to other microbes used in oil recovery. Such *Bacillus subtilis* have been termed members of the B series, including, but not limited to, B1, B2 and B3.

In preferred embodiments, such strains are characterized by enhanced biosurfactant production compared to wild type *Bacillus subtilis* strains. In certain embodiments, the *Bacillus subtilis* strains have increased biopolymer solvent and/or enzyme production.

The B strain series of *Bacillus subtilis* produce more biosurfactant compared to reference strains of *Bacillus subtilis*. Furthermore, the *Bacillus subtilis* strains survive under high salt and anaerobic conditions better than other well-known *Bacillus* strains. The strains are also capable of growing under anaerobic conditions. The *Bacillus subtilis* B series strains can also be used for producing enzymes that degrade or metabolize oil or other petroleum products.

In certain embodiments, the *Bacillus subtilis* strains are salt tolerant. Salt tolerance can be with respect to any one or more of a variety of salts. For example, the salt can be a monovalent salt such as a sodium or potassium salt, e.g., NaCl or KCl, or a divalent salt such as a magnesium or calcium salt, e.g., $MgCl_2$ or $CaCl_2$, or a trivalent salt.

In some embodiments, the *Bacillus subtilis* strains are capable of thriving under low oxygen conditions.

Other microbial strains including, for example, strains capable of accumulating significant amounts of, for example, glycolipid-biosurfactants, can be used in accordance with the subject invention. Other microbial by-products useful according to the present invention include mannoprotein, beta-glucan and other metabolites that have bio-emulsifying and surface/interfacial tension-reducing properties.

Growth of Microbes According to the Subject Invention

The subject invention utilizes methods for cultivation of microorganisms and production of microbial metabolites and/or other by-products of microbial growth. The subject invention further utilizes cultivation processes that are suitable for cultivation of microorganisms and production of microbial metabolites on a desired scale. These cultivation processes include, but are not limited to, submerged fermentation, solid state fermentation (SSF), and combinations thereof.

The microbial cultivation systems would typically use submerged culture fermentation; however, surface culture and hybrid systems can also be used. As used herein "fermentation" refers to growth of cells under controlled conditions. The growth could be aerobic or anaerobic.

In one embodiment, the subject invention provides materials and methods for the production of biomass (e.g., viable cellular material), extracellular metabolites (e.g. small molecules and excreted proteins), residual nutrients and/or intracellular components (e.g. enzymes and other proteins).

The microbe growth vessel used according to the subject invention can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of bacteria in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method of cultivation can provide oxygenation to the growing culture. One embodiment utilizes slow motion of air to remove low-oxygen containing air and introduce oxygenated air. The oxygenated air may be ambient air supplemented daily through mechanisms including impellers for mechanical agitation of the liquid, and air spargers for supplying bubbles of gas to the liquid for dissolution of oxygen into the liquid.

The method can further comprise supplementing the cultivation with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, propanol, butanol, pentanol, hexanol, isobutanol, and/or glycerol; fats and oils such as soybean oil, canola oil, rice bran oil, olive oil, corn oil, sesame oil, and/or linseed oil; etc. These carbon sources may be used independently or in a combination of two or more.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the faun of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included, e.g., L-Alanine.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, calcium carbonate, and/or sodium carbonate. These inorganic salts may be used independently or in a combination of two or more.

In some embodiments, the method for cultivation may further comprise adding additional acids and/or antimicrobials in the liquid medium before, and/or during the cultivation process. Antimicrobial agents or antibiotics are used for protecting the culture against contamination. Additionally, antifoaming agents may also be added to prevent the formation and/or accumulation of foam when gas is produced during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

The method and equipment for cultivation of microorganisms and production of the microbial by-products can be performed in a batch, a quasi-continuous process, or a continuous process.

The microbes can be grown in planktonic form or as biofilm. In the case of biofilm, the vessel may have within it a substrate upon which the microbes can be grown in a biofilm state. The system may also have, for example, the capacity to apply stimuli (such as shear stress) that encourages and/or improves the biofilm growth characteristics.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control bacterial growth.

The biomass content of the fermentation broth may be, for example, from 5 g/l to 180 g/l or more. In one embodiment, the solids content of the broth is from 10 g/l to 150 g/l.

The microbial growth by-product produced by microorganisms of interest may be retained in the microorganisms or secreted into the growth medium. In another embodiment, the method for producing microbial growth by-product may further comprise steps of concentrating and purifying the microbial growth by-product of interest. In a further embodiment, the growth medium may contain compounds that stabilize the activity of microbial growth by-product.

In one embodiment, metabolites are produced by cultivating a microbe strain of the subject invention under conditions appropriate for growth and metabolite production; and, optionally, purifying the metabolite. The metabolite can be any biosurfactant, enzyme, solvent, protein, acid, toxin, or other compound produced by the growth of the microbe.

In one embodiment, all of the microbial cultivation composition is removed upon the completion of the cultivation (e.g., upon, for example, achieving a desired cell density, or density of a specified metabolite in the broth). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a cell-free broth or can contain cells. In this manner, a quasi-continuous system is created.

Microbe-Based Compositions

In one embodiment, the subject invention provides a microbe-based composition for enhancing oil and gas recovery from a hydrocarbon-bearing formation, the composition comprising a microorganism and/or its growth by-products. The growth by-products can be, for example, biosurfactants, solvents, enzymes and/or other metabolites.

The subject composition can be used for degrading, or enhancing the degradation of, polymeric additives in hydraulic fracking wells. The composition can be used to efficiently digest polylactic acid (PLA) used as a friction reducer, breaker, or other fracking fluid additive. The composition can be used to digest, for example, PLA fibers, balls, or flakes. The composition can also be used to efficiently digest polyglycolide (PGA), for example, in the form of fibers or frac balls. The composition can further be used to enhance oil and/or gas recovery.

Advantageously, the subject microbe-based compositions can be used to digest, or enhance the degradation of, polymers in, for example, fracking wells. The subject composition can also be useful as a flowback solution, wherein the biosurfactants and other microbial growth by-products can efficiently decrease water surface tension to a desirable range of, for example, 28-30 dynes/cm. The compositions can also help reduce the energy input required for flushing out fracking materials post-use.

In preferred embodiments, the microbe-based composition comprises microorganisms and/or their by-products. In one embodiment, the microbes used in the methods of the subject invention are one or more biosurfactant-, solvent- and/or enzyme-producing bacteria or yeasts, or a combination thereof. In one embodiment, the microbe-based composition comprises a "killer yeast," such as, for example, *Wickerhamomyces anomalus*, and/or products of the growth of this species. In one embodiment, the microbe is a *Starmerella* clade yeast. In one embodiment the microbe is a *Bacillus* clade bacteria.

The microbe-based composition can comprise the fermentation medium containing a live culture and/or the microbial metabolites produced by the microorganism and/ or any residual nutrients. The product of fermentation may be used directly without extraction or purification. If desired, extraction and purification can be easily achieved using standard extraction and/or purification methods or techniques described in the literature.

The microbe-based composition may comprise broth or medium in which the microbes were grown. The product may be, for example, at least, by weight, 1%, 5%, 10%, 25%, 50%, 75%, or 100% broth. The amount of biomass in the product, by weight, may be, for example, anywhere from 0% to 100% inclusive of all percentages therebetween.

The biomass content of the fermentation broth may be, for example from 5 g/l to 180 g/l or more. In one embodiment, the solids content of the broth is from 10 g/l to 150 g/l.

Further components can be added to the microbe-based composition, for example, buffering agents, carriers, other microbe-based compositions produced at the same or different facility, viscosity modifiers, preservatives, nutrients for microbe growth, tracking agents, biocide, other microbes, surfactants, emulsifying agents, lubricants, solubility controlling agents, pH adjusting agents, preservatives, stabilizers and ultra-violet light resistant agents.

In one embodiment, polymer-degrading enzymes can be included in the microbe-based composition. The enzymes useful according to the present invention can include, for example, proteinases, esterases, lipases, oxidoreductases, hydrolases, lyases, cellulases, hemi-cellulases, pectinases, xanthanase, mannanase, α-galactosidase, amylase, and mixtures thereof, which are capable of degrading polymeric substrates at pH levels found in subterranean formations. In one embodiment, the enzyme is pronase. In another embodiment, the enzyme is proteinase K.

In certain embodiments, the enzymes may be spray-dried, freeze-dried, or the like. In certain embodiments, the enzymes of the compositions may be provided, inter alia, in a purified form, in a partially purified form, as whole cells, as whole cell lysates, or any combination thereof. The concentration of the enzymes should be an amount effective to hasten hydrolysis of the degradable polymer in the well bore to a desired degree at given conditions. For instance, if a relatively faster hydrolysis rate is desired, then a higher concentration of the chosen enzyme or mixture of enzymes could be included. The actual amount included will depend on, inter alia, the temperature of the well bore, the concentration of the degradable polymer, the particular enzyme chosen, and the desired hydrolysis rate.

In one embodiment, the microbe-based composition can further comprise materials to enhance microbe growth during application. These materials can be, for example, nutrients and/or germination enhancers. The nutrient sources can include, for example, nitrogen, nitrates, nitrites, phosphorus, magnesium and/or carbon, or any other nutrient source that can be used for cultivating the microbes as provided in this disclosure. The germination enhancers can include, for example, L-alanine, L-valine, L-asparagine and/or manganese in micromolar amounts.

In one embodiment, the composition can further comprise buffering agents, including organic and amino acids or their salts, to stabilize pH near a preferred value. Suitable buffers include, but are not limited to, citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and mixtures thereof. Phosphoric and phosphorous acids or their salts may also be used. Synthetic buffers are suitable to be used but it is preferable to use natural buffers such as organic and amino acids or their salts.

In a further embodiment, pH adjusting agents include potassium hydroxide, ammonium hydroxide, potassium carbonate or bicarbonate, hydrochloric acid, nitric acid, sulfuric acid and mixtures thereof.

The pH of the microbe-based composition should be suitable for the microorganism of interest. In a preferred embodiment, the pH of the microbe-based composition ranges from 7.0-7.5.

In one embodiment, additional components such as an aqueous preparation of a salt, such as sodium bicarbonate or carbonate, sodium sulfate, sodium phosphate, or sodium biphosphate, can be included in the microbe-based composition.

In certain embodiments, the compositions of the subject invention have advantages over, for example, biosurfactants or enzymes alone, including one or more of the following: high concentrations of mannoprotein (a bioemulsifier) as a part of yeast cell wall's outer surface; the presence of biopolymer beta-glucan (an emulsifier) in yeast cell walls; the presence of biosurfactants in the culture that are capable of reducing both surface and interfacial tension; and the presence of solvents and/or metabolites (e.g., lactic acid, ethanol, ethyl acetate, etc.).

Preparation of Microbe-Based Products

One microbe-based product of the subject invention is simply the fermentation broth containing the microorganism and/or the microbial metabolites produced by the microorganism and/or any residual nutrients. The product of fermentation may be used directly without extraction or purification. For example, the microbes and/or broth resulting from the microbial growth can be removed from the growth vessel and transferred via, for example, piping for immediate use.

If desired, extraction and purification can be easily achieved using standard extraction and/or purification methods or techniques described in the literature.

Upon harvesting the microbe-based composition from the growth vessels, further components can be added as the harvested product is placed into containers and/or piped (or otherwise transported for use). The additives can be, for example, buffers, carriers, other microbe-based compositions produced at the same or different facility, viscosity modifiers, preservatives, nutrients for microbe growth, germination enhancers, and the like.

In one embodiment, the composition (microbes, broth, or microbes and broth) can be placed in containers of appropriate size, taking into consideration, for example, the intended use, the contemplated method of application, the size of the fermentation tank, and any mode of transportation from microbe growth facility to the location of use. Thus, the containers into which the microbe-based composition is placed may be, for example, from 1 gallon to 1,000 gallons or more. In other embodiments the containers are 2 gallons, 5 gallons, 25 gallons, or larger.

Other microbial strains including, for example, other fungal strains capable of digesting polymers such as PLA or accumulating significant amounts of, for example, glycolipid-biosurfactants and/or solvents and/or enzymes can be used in accordance with the subject invention. Biosurfactants and solvents that are useful according to the present invention include mannoprotein, beta-glucan, ethanol, lactic acid and other metabolites that have, for example, bioemulsifying and surface/interfacial tension-reducing properties. Enzymes useful according to the present invention include polymer-degrading enzymes that are capable of degrading polymeric substances in conditions (e.g., pH and temperature) present in a subterranean formation.

Other suitable additives, which may be contained in the formulations according to the invention, include substances that are customarily used for such preparations. Example of such additives include surfactants, emulsifying agents, lubricants, buffering agents, solubility controlling agents, pH adjusting agents, preservatives, stabilizers and ultra-violet light resistant agents.

In one embodiment, the composition may further comprise buffering agents including organic and amino acids or their salts. Suitable buffers include citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used but it is preferable to use natural buffers such as organic and amino acids or their salts listed above.

In a further embodiment, pH adjusting agents include potassium hydroxide, ammonium hydroxide, potassium carbonate or bicarbonate, hydrochloric acid, nitric acid, sulfuric acid or a mixture.

In one embodiment, additional components such as an aqueous preparation of a salt as polyprotic acid such as sodium bicarbonate or carbonate, sodium sulfate, sodium phosphate, sodium biphosphate, can be included in the formulation.

Advantageously, in accordance with the subject invention, the microbe-based product may comprise broth in which the microbes were grown. The product may be, for example, at least, by weight, 1%, 5%, 10%, 25%, 50%, 75%, or 100% broth. The amount of biomass in the product, by weight, may be, for example, anywhere from 0% to 100% inclusive of all percentages therebetween.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C. On the other hand, a biosurfactant composition can typically be stored at ambient temperatures.

In one embodiment, the subject invention provides yeast fermentation products that can be used to digest, or enhance the degradation of, polymers in fracking wells. The yeast fermentation product can be obtained via cultivation of a biosurfactant-, solvent- and/or enzyme-producing yeast, such as, for example, *Wickerhamomyces anomalus* (*Pichia anomala*). The fermentation broth after 7 days of cultivation at 25-30° C. can contain the yeast cell suspension and, for example, 4 g/L or more of biosurfactant.

The yeast fermentation product can also be obtained via cultivation of a biosurfactant-, solvent- and/or enzyme-producing yeast, such as, for example, *Starmerella bombicola*. The fermentation broth after 5 days of cultivation at 25° C. can contain the yeast cell suspension and, for example, 100 g/L or more of biosurfactant.

In one embodiment, the composition according to the subject invention is obtained through cultivation processes ranging from small to large scale. The cultivation process can be, for example, submerged cultivation, solid state fermentation (SSF), and/or a combination thereof.

The microorganisms in the microbe-based composition may be in an active or inactive form. The microorganisms can be in vegetative form, spore form or any other form of microbial propagule, or a combination thereof. The microbe-based products may be used without further stabilization, preservation, and storage. Advantageously, direct usage of these microbe-based products preserves a high viability of the microorganisms, reduces the possibility of contamination from foreign agents and undesirable microorganisms, and maintains the activity of the by-products of microbial growth.

Local Production of Microbe-Based Products

In preferred embodiments of the subject invention, a microbe growth facility produces fresh, high-density microorganisms and/or microbial growth by-products of interest on a desired scale. The microbe growth facility may be located at or near the site of application. The facility produces high-density microbe-based compositions in batch, quasi-continuous, or continuous cultivation.

The distributed microbe growth facilities of the subject invention can be located at the location where the microbe-based product will be used (e.g., a mine) or near the location of use. For example, the microbe growth facility may be less than 300, 250, 200, 150, 100, 75, 50, 25, 15, 10, 5, 3, or 1 mile from the location of use.

Because the microbe-based product is generated locally, without resort to the microorganism stabilization, preservation, storage and transportation processes of conventional microbial production, a much higher density of live microbes in a vegetative or propagule state can be generated, thereby requiring a smaller volume of the microbe-based product for use in the on-site application or which allows much higher density microbial applications where necessary to achieve the desired efficacy. This allows for a scaled-down bioreactor (e.g., smaller fermentation tank, smaller supplies of starter material, nutrients, pH control agents, and de-foaming agents) with no reason to stabilize the cells or separate them from their culture broth, which makes the system efficient and facilitates the transportability of the product.

Local generation of the microbe-based product also facilitates the inclusion of the growth broth in the product. The broth can contain agents produced during the fermentation that are particularly well-suited for local use.

Locally-produced high density, robust cultures of microbes are more effective in the field than those that have undergone vegetative cell stabilization or have sat in the supply chain for some time. The microbe-based products of the subject invention are particularly advantageous compared to traditional products wherein cells have been separated from metabolites and nutrients present in the fermentation growth media. Reduced transportation times allow for the production and delivery of fresh batches of microbes and/or their metabolites at the time and volume as required by local demand.

The microbe growth facilities of the subject invention produce fresh, microbe-based compositions, comprising the microbes themselves, microbial metabolites, and/or other components of the broth in which the microbes are grown. If desired, the compositions can have a high density of vegetative cells or a mixture of vegetative cells, reproductive spores, conidia, and/or mycelia.

Advantageously, the compositions can be tailored for use at a specified location. In one embodiment, the microbe growth facility is located on, or near, a site where the microbe-based products will be used.

Advantageously, these microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell-count product and the associated broth and metabolites in which the cells are originally grown.

Advantageously, in preferred embodiments, the systems of the subject invention harness the power of naturally-occurring local microorganisms and their metabolic by-products to improve oil production. The microbe growth facilities provide manufacturing versatility by the ability to tailor the microbe-based products to improve synergies with destination geographies. Local microbes can be identified based on, for example, salt tolerance, and ability to grow at high temperatures.

The cultivation time for the individual vessels may be, for example, from 1 to 7 days or longer. The cultivation product can be harvested in any of a number of different ways.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

In one embodiment, the composition according to the subject invention is obtained through cultivation processes ranging from small (e.g., lab setting) to large (e.g., industrial setting) scales. These cultivation processes include, but are not limited to, submerged cultivation/fermentation, solid state fermentation (SSF), and combinations thereof.

Advantageously, the microbe-based products can be produced in remote locations. The microbe growth facilities may operate off the grid by utilizing, for example, solar, wind and/or hydroelectric power.

Enhanced Oil and Gas Recovery and Enhanced Polymer Degradation and Recovery

In one embodiment the subject invention provides a method of improving oil and gas well performance, or enhancing oil and gas recovery, by enhancing the degradation of polymeric additives utilized in fracturing fluids, as proppant coating, or in frac balls.

The method can also be useful for well completion, particularly in fracking operations, as well as restoring the health of oil and gas-bearing formations (i.e., rejuvenation of older fracked formations). For example, the subject compositions and methods can aid in the repair of formation damage in the areas surrounding a wellbore, and can remediate polymers (e.g., PLA and PGA) and biopolymers (e.g., guar gum and xanthan gum) that are left over from previous fracking operations. Thus, clogged channels can be opened up within formations to allow for further fracking opportunities.

In one embodiment the method comprises applying a composition comprising one or more strains of microorganisms, and/or a growth by-product thereof, to an oil well undergoing hydraulic fracking treatment. The growth by-product can be any microbial metabolite, such as, for example, a biosurfactant, a solvent and/or an enzyme. This method can be applied to vertical wells as well as horizontal wells.

Preferably, the microbes of the microbe-based composition and/or their growth byproducts can quickly digest polymers, such as, e.g., PLA or PGA; thus, the method can improve the ability to recover hydrocarbon resources by reducing the buildup of PLA, PGA, or other polymers and/or resins within the fractures and wellbores of fracking wells.

In one embodiment, the microorganism is a yeast, for example, *Wickerhamomyces anomalus* and/or *Starmerella bombicola*. In one embodiment, the microorganism is a bacteria, such as, for example, a species of *Bacillus* clade bacteria. In one embodiment, a combination of microorganisms is utilized in the microbe-based composition. The microbe can be live (or viable), or in spore form, at the time of application.

The microorganisms can grow in situ and produce active compounds onsite. Consequently, a high concentration of, for example, biosurfactant, solvent, and/or enzyme, and biosurfactant-producing microorganisms at a treatment site (e.g., an oil well) can be achieved easily and continuously.

The method can further comprise adding materials to enhance microbe growth and/or germination during application (e.g., adding nutrients to promote microbial growth and/or germination enhancers). In one embodiment, the nutrient sources can include, for example, nitrogen, nitrate, phosphorus, magnesium and/or carbon. In one embodiment, the germination enhancers can include, for example, L-alanine, L-valine, L-asparagine and/or manganese in micromolar amounts.

In one embodiment, the method can further comprise adding polymer-degrading enzymes to the site in order to enhance polymer degradation.

The method can be performed in situ by applying the composition and optional nutrients and/or other agents directly in an oil reservoir or in fracking fluid.

In one embodiment, the treatment can be applied down the casing of a well using standard pumping and/or coiled tubing. A pump at the surface of the well forces the composition fluid into the formation, and the tubing helps to isolate different fracking zones so that all zones within the well can be reached. Some wells can have as many as 20 or more different frack zones.

In one embodiment, the amount and concentration of the microbe-based composition applied to the well is determined by the length of the frack zone and the depth of the well. For example, the volume of treatment applied can range from 300 gallons to 3,000 gallons or more.

In one embodiment, the treatment is applied after primary fracking is completed, for example, up to five or more years afterward. In another embodiment, the treatment is applied once the well starts losing production due to polymer build up. In another embodiment, the treatment is applied immediately after fracking has been completed.

In one embodiment, the method can further comprise the step of applying heat to the fracking treatment in order to further speed up the rate of polymer degradation.

In one embodiment, the subject invention provides methods of producing a polymer-degrading enzyme by cultivating a microbe strain of the subject invention under conditions appropriate for growth and enzyme production; and optionally, purifying the enzyme.

The methods of the present invention can be used to degrade a variety of polymers, particularly those used as additives in hydraulic fracturing fluids. Non-limiting examples of polymers include polylactic acid, or poly(lactic acid), or polylactide (PLA), other polyesters, guar-based additives, starches, polybutylene adipate terephthalate (PBAT), polyhydroxyalkanoates (PHAs), polyacrylamide (PAM), polybytlene succinate (PBS), polycaprolactone (PCL), polyglycolic acid (PGA), polyhydroxybutyrates (PHBs) and/or blends of these materials. The properties, including degradation time under selected environments, of such polymers can depend on molecular weight distribution, crystallinity, co-polymers and additives.

In preferred embodiments, the present invention can be used to degrade polylactic acid, or PLA. PLA is a biodegradable thermoplastic polyester with a melting point of around 150° C. It been used, for example, to make food safe containers, molded parts, films, foams, fibers, and as a material for 3D printing. In the oil and gas industry, PLA is used as an additive in fracturing treatments for increasing the productivity of fracking wells. For example, PLA fibers are used to prevent proppant flowback, and PLA flakes and balls are used as friction reducers and breakers.

In further embodiments, the present invention can be used to degrade polyglycolide, or PGA. PGA is also a biodegradable thermoplastic polyester with a melting point of around 200° C. It has been used, for example, to make medical implants and drug delivery carriers, as well as absorbable sutures. In the oil and gas industry, PGA has been used as a time release agent for corrosion inhibitors, a dispersant, a decomposition inhibitor for lubricants in moving equipment, a diverting agent, or to dissolve scale and prevent corrosion, or in the form of fracking balls to allow for zone fracking.

PLA and PGA can be derived from chemical synthesis or from renewable resources, for example, from fermentation of sugar or cornstarch. PLA can also be produced from petroleum. Because of the chemical properties of PLA and PGA, these particular polymers can take days or even months to degrade using, for example, water or other natural processes alone.

Thus, the present invention is advantageous in that it provides compositions and methods for degrading, or enhancing the degradation of, polymers such as PLA or PGA that can build up in fracking wells and decrease productivity of wells. As used herein, "enhanced degradation" refers to decreasing the time for degradation to occur.

In one embodiment, the subject invention provides methods of recovering, or bringing to the surface, polymeric substances that remain in fracking wells. For example, biosurfactants produced by methods and microorganisms of the present invention can reduce interfacial tension of fluids. Thus, the fluids can then be used for uplifting polymeric fracking substances, such as polyacrylamide (PAM) gel friction reducers, with greater ease and less energy expenditure. In another embodiment, the biosurfactants can be used to cleave PAM gel.

In another embodiment, the microbe-based products and compositions of the subject invention can be used in wells undergoing acid fracking treatments. In acid fracturing, acids such as hydrochloric acid, formic acid, and acetic acid, are used to etch channels into the rock formation of a well. Diverters are used to create barriers in certain perforations in the formation, thus directing acid to other desired areas.

In one embodiment, methods are provided for remediating, i.e., degrading, acids and other diverters used in acid treatments using microbe-based compositions of the subject invention. In particular, a method of remediating benzoic acid diverters is provided, comprising applying the microbe-based compositions of the subject invention to a well undergoing acid fracturing.

Benzoic acid flakes or powder are soluble in toluene, xylene, alcohol, and some condensate fluids, but they dissolve very slowly in water or gas. Benzoic acid is often used as a diverter because it is soluble in the fluids normally encountered in wells; however, if not well dispersed or mixed, it will plug perforations. When such a plug occurs, it cannot be dissolved quickly because of decreased fluid flow. For example, benzoic acid plugs can take six months or more to return to normal productivity after being treated with benzoic acid.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Cultivation of *Wickerhamomyces anomalus* and *Starmerella bombicola* Yeast Products Seed culture be maintained by streaking fresh liquid culture on potato dextrose agar plate and growing the seed culture at 30° C. for 3 days. Afterwards, the plates of seed culture can be stored at 4° C. for a maximum of 2 weeks.

YGSU medium was used for cultivating the yeast. For *W. anomalus*, the initial pH was adjusted to 5.5. Seed culture was transferred from the agar plate to a 1 L flask with a working volume of 200 mL. The culture was cultivated in a shaker at 30° C. with a shaking speed of 200 rpm. After 7 days, biosurfactants were observed as a brown precipitate layer, with concentration around 4 g/L.

For *S. bombicola*, the fermentation broth after 5 days of cultivation at 25° C. can contain the yeast cell suspension and, for example, 100 g/L or more of biosurfactant.

Example 2—Treatment of PLA Balls with Yeast Product

Figure 2:
FIG. 2 shows PLA digestion over a 24 hour period using yeast digestion treatment (middle) versus water alone (right). Yeast digestion resulted in complete dissolution, whereas water alone only resulted in about 1% dissolution.

As shown in FIGS. 1 and 2, the yeast fermentation products can be incubated with fracking fluid containing, for example, PLA balls, for 24 hours. A PLA ball after incubation with the yeast fermentation product was completely dissolved, whereas when incubated for the same time period with water alone, only 1% total dissolution occurred (requiring approximately one month to dissolve completely).

The invention claimed is:

1. A method of recovering a polymer used in hydraulic fracking fluids from a fracking well, wherein the polymer is polyacrylamide (PAM) gel, wherein the method comprises applying a composition comprising a fermentation broth in which one or more microorganisms were cultivated, said fermentation broth comprising the one or more microorganisms and/or a growth by-product thereof, and optionally, one or more nutrients and/or germination enhancers, to a fluid, injecting the fluid into the well, and uplifting the PAM gel from the well using the fluid, wherein the one or more microorganisms are selected from *Starmerella bombicola* and *Wickerhamomyces anomalus*.

2. The method of claim 1, wherein prior to uplifting, the PAM gel is cleaved by the composition.

3. The method of claim 1, wherein the growth by-product is a glycolipid biosurfactant.

* * * * *